(12) United States Patent
Hummelshøj

(10) Patent No.: US 9,914,492 B1
(45) Date of Patent: Mar. 13, 2018

(54) LOW-PROFILE VEHICLE

(71) Applicant: Toyota Research Institute, Inc., Los Altos, CA (US)

(72) Inventor: Jens Strabo Hummelshøj, Burlingame, CA (US)

(73) Assignee: Toyota Research Institute, Inc., Los Altos, CA (US)

(\*) Notice: Subject to any disclaimer, the term of this patent is extended or adjusted under 35 U.S.C. 154(b) by 0 days.

(21) Appl. No.: 15/486,605

(22) Filed: Apr. 13, 2017

(51) Int. Cl.
| | |
|---|---|
| *B62D 31/00* | (2006.01) |
| *B62D 23/00* | (2006.01) |
| *B62D 47/00* | (2006.01) |
| *B62D 35/00* | (2006.01) |
| *B62D 51/00* | (2006.01) |

(Continued)

(52) U.S. Cl.
CPC ............. *B62D 31/003* (2013.01); *B60G 3/12* (2013.01); *B60G 5/02* (2013.01); *B60K 7/0007* (2013.01); *B60L 8/003* (2013.01); *B60R 1/10* (2013.01); *B60R 21/00* (2013.01); *B62D 23/00* (2013.01); *B62D 35/005* (2013.01); *B62D 47/006* (2013.01); *B62D 51/00* (2013.01); *B60G 2300/122* (2013.01); *B60G 2300/13* (2013.01); *B60G 2300/38* (2013.01); *B60R 2021/002* (2013.01); *B60R 2021/0034* (2013.01); *B60Y 2200/112* (2013.01)

(58) Field of Classification Search
CPC .... B62D 31/003; B62D 23/00; B62D 35/005; B62D 47/006; B62D 51/00; B60G 5/02; B60G 3/12; B60G 2300/122; B60G 2300/13; B60G 2300/38; B60K 7/0007; B60L 8/003; B60R 1/10; B60R 21/00; B60R 2021/002; B60R 2021/0034; B60Y 2200/112
USPC ................................ 180/2.2; 280/6.15, 6.157
See application file for complete search history.

(56) References Cited

U.S. PATENT DOCUMENTS

| | | | |
|---|---|---|---|
| 4,020,914 A | 5/1977 | Trautwein | |
| 4,410,198 A * | 10/1983 | Fernandez | B62K 5/05 280/231 |

(Continued)

OTHER PUBLICATIONS

Vincent, Alice, "New Designs and Records Set at the Shell Eco-Marathon", Wired Technology Jun. 1, 2011, Wired in 22 pages.

(Continued)

*Primary Examiner* — John D Walters
(74) *Attorney, Agent, or Firm* — Christopher G. Darrow; Darrow Mustafa PC

(57) ABSTRACT

System, methods, and other embodiments described herein relate to a low-profile vehicle. In one embodiment, the low-profile vehicle includes a vehicle body having a profile that is substantially continuous around an outer perimeter of the vehicle. The profile is comprised of a fin extending outward from a lower edge of the vehicle body and meeting a ramp of the vehicle body at a concave curve. The ramp continues from the concave curve into a convex curve where the ramp transitions into a top surface of the vehicle body. The profile has an exaggerated s-shape. The low-profile vehicle includes a hatch disposed within the top surface. The vehicle includes a passenger compartment disposed within the vehicle body and accessible through the hatch. The passenger compartment is shaped to provide for a passenger to occupy the vehicle in a substantially lying down position.

20 Claims, 6 Drawing Sheets

(51) Int. Cl.
  *B60K 7/00* (2006.01)
  *B60L 8/00* (2006.01)
  *B60G 3/12* (2006.01)
  *B60G 5/02* (2006.01)
  *B60R 1/10* (2006.01)
  *B60R 21/00* (2006.01)

(56) References Cited

U.S. PATENT DOCUMENTS

| | | |
|---|---|---|
| 5,242,181 A | 9/1993 | Fales et al. |
| 5,417,300 A | 5/1995 | Shultz |
| 6,015,022 A | 1/2000 | Thuliez |
| 6,423,894 B1 * | 7/2002 | Patz .......................... B60J 7/00 136/244 |
| 7,950,479 B2 | 5/2011 | Bullis |
| 8,057,138 B2 | 11/2011 | Burns |
| 2011/0079166 A1 * | 4/2011 | Popa-Simil ............ B60K 16/00 105/1.4 |
| 2013/0153311 A1 | 6/2013 | Huntzinger |
| 2015/0100179 A1 | 4/2015 | Alaniz et al. |

OTHER PUBLICATIONS

"Extruda Single Seater Aerodynamic People Mover" retrieved on Feb. 2, 2017 from https://www.cgtrader.com/free-3d-models/car/sport/extruda-single-seater-aerodynamic-people-mover in 4 pages.
"Alerion Supermileage—Our Vehicle" retrieved on Feb. 2, 2017 from www.alerionsupermileage.com/en/ in 2 pages.
MicroJoule, retrieved on Apr. 12, 2017 from "http://www.la-joliverie.com/projets-pedagogiques/projets/330-microjoule-cityjoule-polyjoule.html" in 8 pages.

* cited by examiner

FIG. 11
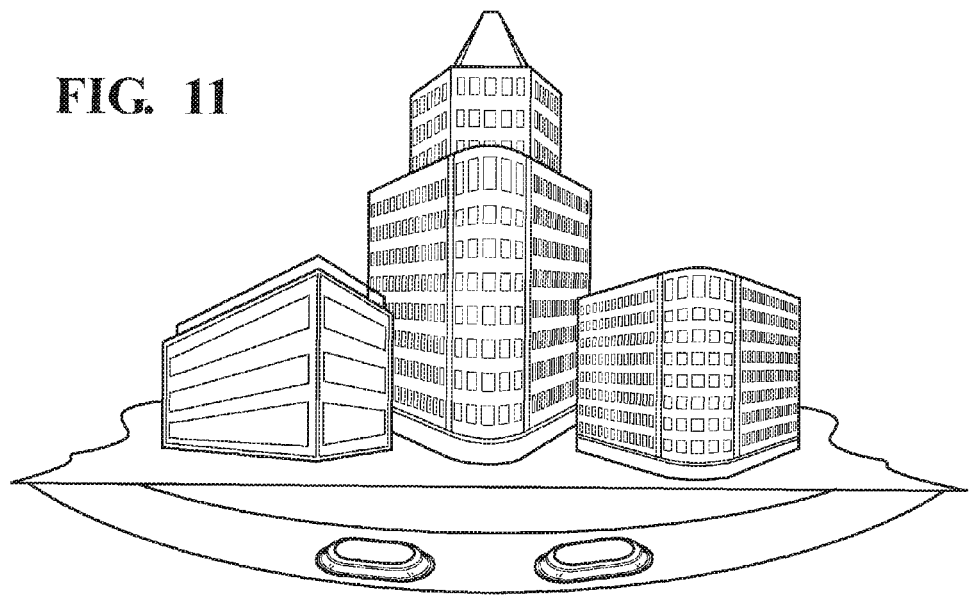
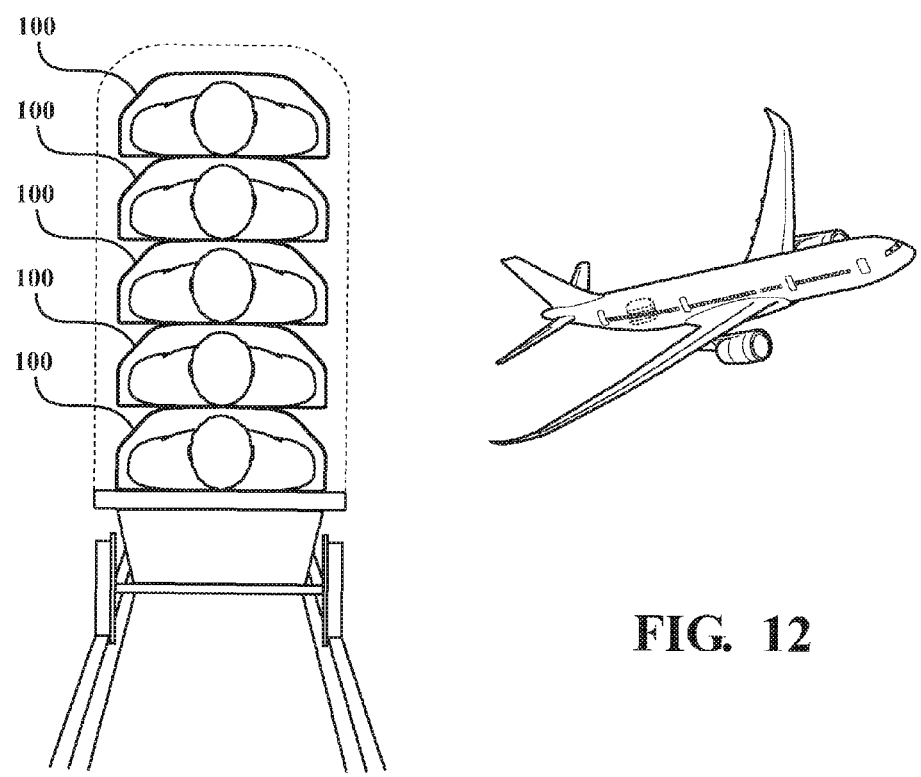
FIG. 12

LOW-PROFILE VEHICLE

TECHNICAL FIELD

The subject matter described herein relates in general to automobiles and, more particularly, to a low-profile vehicle having a body that is substantially flat and shaped to deflect impacts.

BACKGROUND

Modern vehicles are generally designed to accommodate multiple passengers along with cargo. To accommodate these basic design aspects, vehicles incorporate up-right seating for passengers along with a trunk or other designated space for cargo. As a result, many vehicles have a similar overall design with side opening doors, forward-facing seats, a forward-facing windshield, and so on. Consequently, a forward cross-section can be relatively large and thus have a significant aerodynamic cost. Accordingly, a fuel economy of the vehicle can be negatively affected. Moreover, the design also complicates designing safety systems since the relatively large cross-sections do not generally facilitate mitigating impact forces with other vehicles and/or objects.

SUMMARY

An example of a low-profile vehicle is described herein. In one embodiment, the profile of the vehicle is designed to have a low cross-sectional area. For example, a passenger compartment is provided such that a passenger does not sit upright within the vehicle but instead lies in a prone position or a face-up position such that an overall cross-sectional area of the vehicle can be reduced and is proportional to the lying position of the passenger along the roadway. Moreover, a profile of a body of the low-profile vehicle is provided to be aerodynamic in order to reduce aerodynamic drag. As an additional aspect of the vehicle profile, impact forces from collisions with other vehicles and/or objects are reduced by providing the vehicle profile with a ramp type of shape. The ramp shape permits other vehicles to roll-over the low-profile vehicle instead of inducing direct impact forces. In this way, a safety of the low-profile vehicle can be improved.

Furthermore, in additional embodiments, the low-profile vehicle can have further features such as an integrated virtual reality (VR) head-mounted display for providing the passenger with a forward view, a monocoque design, autonomous driving features, and so on.

In one embodiment, a low-profile vehicle is disclosed. The low-profile vehicle includes a vehicle body having a profile that is substantially continuous around an outer perimeter of the vehicle. The profile is comprised of a fin extending outward from a lower edge of the vehicle body and meeting a ramp of the vehicle body at a concave curve. The ramp continues from the concave curve into a convex curve where the ramp transitions into a top surface of the vehicle body. The profile has an exaggerated s-shape. The low-profile vehicle includes a hatch disposed within the top surface. The vehicle includes a passenger compartment disposed within the vehicle body and accessible through the hatch. The passenger compartment is shaped to provide for a passenger to occupy the vehicle in a substantially lying down position.

In one aspect, the present disclosures presents one embodiment of a vehicle. The vehicle includes a vehicle body having a profile that is substantially continuous around an outer perimeter of the vehicle. The profile is comprised of a fin extending outward from a lower edge of the vehicle body and meeting a ramp of the vehicle body at a concave curve. The ramp continues from the concave curve into a convex curve where the ramp transitions into a top surface of the vehicle body. The vehicle body is a monocoque. A ratio of a concave radius of the concave curve to a convex radius of the convex curve is proportional to an average size of a vehicle tire to permit the profile of the vehicle body to deflect impacts with other vehicles. The vehicle includes a hatch disposed within the top surface. The vehicle includes a passenger compartment disposed within the vehicle body and accessible through the hatch. The passenger compartment is shaped to provide for a passenger to occupy the vehicle in a substantially lying down position. The vehicle includes a set of wheels extending from an underside of the vehicle body and extending into housings within the passenger compartment. The housings are positioned within the passenger compartment between limbs of the passenger.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 11 illustrates one embodiment of the low-profile vehicle passing through a tunnel.

FIG. 12 illustrates one embodiment of multiple low-profile vehicles in a stacked configuration.

DETAILED DESCRIPTION

Various embodiments associated with a low-profile vehicle are disclosed herein. As previously mentioned, many vehicle designs suffer from a large frontal cross-section which can influence aerodynamic drag and fuel economy along with additional aspects such as safety of a vehicle. Specifically, because many vehicles are designed to accommodate multiple passengers and additional cargo, the design is constrained to a frontal cross section that may not perform optimally in fuel economy, and that does not deflect collisions.

Therefore, in one embodiment, a low-profile vehicle is provided with a frontal cross-section that is reduced by providing accommodations for a passenger in a substantially lying position. Thus, in one embodiment, a passenger compartment is substantially flat and elongated along a surface of the roadway to provide for a passenger to lie down while within the low-profile vehicle without providing space to sit or stand. Moreover, a shape of a vehicle body of the low-profile vehicle is designed to be aerodynamic and to act as a ramp or deflector in order to deflect collisions with other vehicles and/or objects. In this way, the low-profile vehicle both improves aerodynamic drag and improves safety of a passenger.

Figure 1:
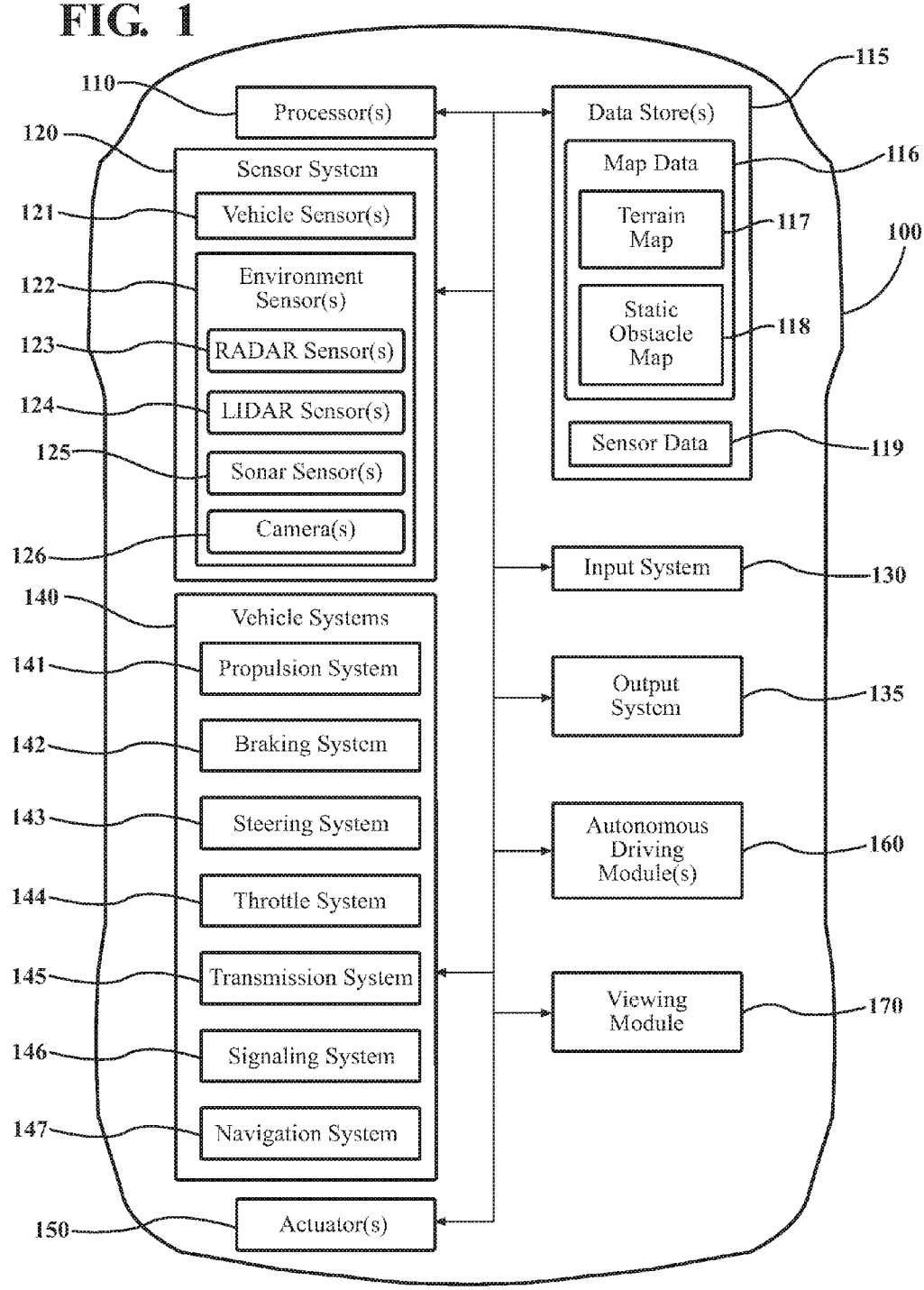
FIG. 1 illustrates one embodiment of vehicle systems which can be integrated with a low-profile vehicle.

Referring to FIG. 1, an example of systems that can be included within a vehicle 100 are illustrated. As used herein, a "vehicle" is a form of motorized transport that can accommodate at least one passenger. In one or more implementations, the vehicle 100 is an automobile. Furthermore, while arrangements will be described herein with respect to automobiles, it will be understood that embodiments are not limited to automobiles. In some implementations, the vehicle 100 may be any other form of motorized transport that benefits from the noted design features.

Additionally, the vehicle 100 is illustrated in FIG. 1 as including various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances. Moreover, while the various elements of FIG. 1 are illustrated in a combined configuration, in various embodiments, some of the illustrated elements may be located remotely from the vehicle 100.

Some of the possible elements of the vehicle 100 are shown in FIG. 1 and will be described along with subsequent figures. However, a description of many of the elements in FIG. 1 will be provided after the discussion of FIGS. 2-12 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

Figure 2:
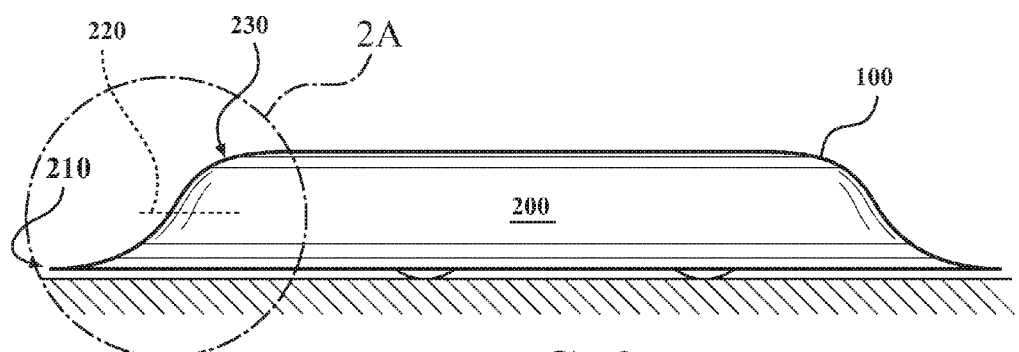
FIG. 2 illustrates an external side view of one embodiment of the low-profile vehicle.

With reference to FIG. 2, an external side view of one embodiment of the vehicle 100 is illustrated. As will become further apparent with subsequent discussion of other figures, a profile of a vehicle body 200 is generally comprised of two separate curves. That is, the profile of the vehicle body 200 around a full perimeter of the vehicle 100, in one embodiment, is provided as an exaggerated s-shape or also referred to as a ramp. For example, as shown in FIG. 2 a fin 210 extends from a lower edge of the vehicle body 200. The fin 210 is illustrated in FIG. 2 as extending to an exaggerated extent from the lower edge of the vehicle body 200; however, it should be appreciated that in various embodiments the fin 210 can extend varying amounts depending on a particular implementation. In either case, as shown in FIG. 2, the profile is formed from the fin 210 extending into the vehicle body 200 at a concave curve. The profile transitions at 220 from the concave curve into a ramp 230 that is formed from a convex curve.

Figure 2A:
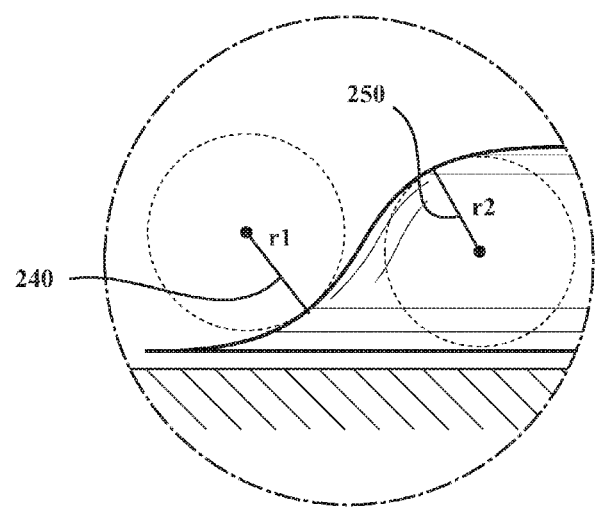
FIG. 2A illustrates a magnified view of a profile of the vehicle illustrated in FIG. 2.

As further explanation, the profile is further illustrated in FIG. 2A within a zoomed window. The profile of the vehicle body 200 is comprised of the concave curve and the convex curve as previously mentioned. The concave curve has a radius r1 240 while the convex curve has a radius r2 250. In one embodiment, a shape of the profile is generally determined according to relative radii of the radius 240 and the radius 250. For example, the radii 240 and 250 can be selected in order to minimize, deflect, or otherwise reduce impact forces when colliding with a tire or other part of another vehicle. As one example, the radii 240 and 250 can be selected in order to provide the profile of the vehicle body 200 with a shape that is proportional to an average radius of a car tire. That is, the profile, which extends substantially around a full circumference of the vehicle body 200 can be provided with a profile that causes objects to deflect off of the vehicle 100 instead of, for example, crumpling and absorbing an impact. Thus, the profile can have a ramp shape similar to a speed-ramp/bump/table.

Moreover, a height of the vehicle body 200 from a surface of a roadway is generally determined according to a thickness of a passenger when lying down and the radii 240 and 250 in relation to an average vehicle tire. Thus, in one embodiment, the vehicle body 200 extends above the ground to a body height that is proportional to a passenger thickness when in the lying down position within the passenger compartment. While the passenger thickness is generally discussed, it should be appreciated that the passenger thickness can be selected in relation to an average thickness across a large sample size in order to accommodate a wide range of body shapes. Additionally, the body height of the vehicle 100 is, in one embodiment, also proportional to the radii 240 and 250 as the radii 240 and 250 relate to, for example, an average vehicle wheel/tire diameter in order to support deflecting collisions and also reducing aerodynamic drag.

Figure 3:
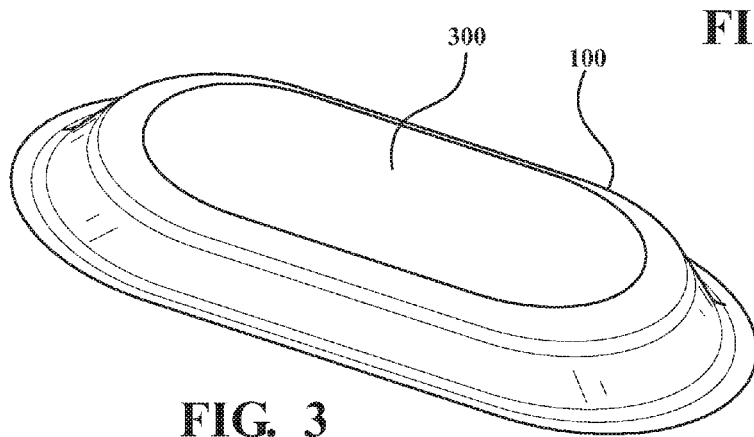
FIG. 3 illustrates a three-dimensional projection of one embodiment of the low-profile vehicle.

With reference to FIG. 3, one embodiment of a three-dimensional projection of the vehicle 100 is illustrated. FIG. 3 illustrates how the profile of the vehicle body 200 is substantially continuous around a perimeter of the vehicle 100. That is, the previously described exaggerated s-shape profile occurs along the vehicle body 200 around the vehicle 100 on all sides. As a result, the profile of the vehicle 100 can deflect impacts from whichever location/angle the impacts originate.

Additionally, as shown in FIG. 3, a hatch 300 is disposed within a top surface of the vehicle 100. Thus, a passenger can enter the vehicle 100 through the hatch 300 by stepping into the vehicle 100 and lying flat. In one embodiment, the passenger compartment is disposed within the vehicle body 200 and provides for a single passenger lying in either a prone position or flat on their back. Furthermore, in one embodiment, the vehicle 100 and the vehicle body 200 are a monocoque. That is, for example, the vehicle body 200 is an outer skin of the vehicle 100 and also is a primary support structure of the vehicle 100. Thus, in this configuration, the vehicle body 200 along with the hatch 300 form a passenger compartment within the vehicle body 200 and also support the passenger and any additional loads on the vehicle 100.

In an alternative embodiment, the vehicle 100 may include structural members attached to or embedded within the vehicle body 200 to assist in supporting a load of the passenger and other systems of the vehicle. However, the general preferred embodiment is a monocoque design where the vehicle body 200 is formed from a single extrusion, vacuum formed, molded, or other manufacture of material. For example, the vehicle body 200 can be formed from a composite material, a fibrous material (e.g., fiberglass or carbon fiber), an epoxy resin set using a mold, and so on. In further embodiments, the vehicle body 200 can be formed from a combination of materials. In one aspect, the vehicle body 200 can have the hatch 300 formed from an array of solar cells. The array of solar cells can be embedded on an outer surface of the hatch 300 or function as the outer surface itself.

Moreover, the vehicle 100 can have a tubular steel, aluminum, composite or other frame embedded within the vehicle body 200. Further, the vehicle body 200 can be 3-D printed from a particular polymer or other material. In either case, many different materials and/or combinations of materials can be implemented to construct the vehicle body 200 and structural members if present.

Figure 4:
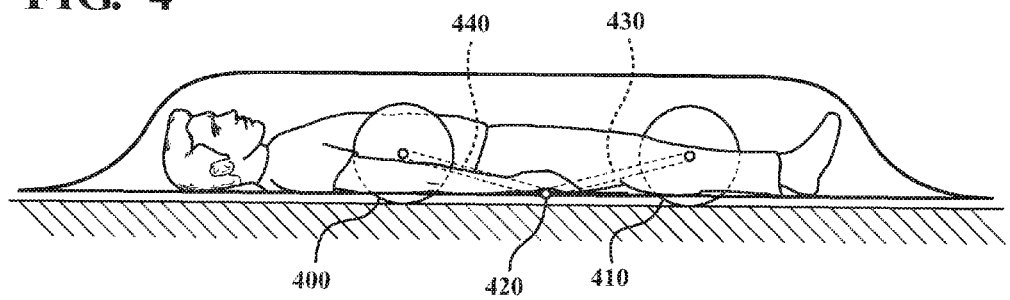
FIG. 4 illustrates a cutaway side-view of one embodiment of the low-profile vehicle.

FIG. 4 illustrates a further embodiment of the vehicle 100. In FIG. 4, the vehicle 100 is shown from a side view that is a cutaway. That is, the illustration of FIG. 4 is without a side of the vehicle body 200 in order to show at least some interior aspects of the vehicle 100. Thus, FIG. 4 illustrates a passenger lying down within the passenger compartment. In the illustrated embodiment, wheels 400 and 410 are illustrated between limbs of the passenger. That is, the wheel 410 is, in one embodiment, mounted within a housing that is formed between legs of the passenger in the passenger compartment. Similarly, the wheel 400 is mounted in a housing within the passenger compartment that is between a body and an arm of the passenger. A third wheel that forms a set of wheels with the wheels 400 and 410 is behind the wheel 400 as illustrated and thus is not shown. In either case, the wheels extend from an underside of the vehicle 100. Moreover, a pivot point 420 connects members 430 and 440 to wheels 410 and 400 respectively. A third member connecting the pivot 420 to the hidden wheel is similarly configured. The pivot 420 and the associated members form a "Y" configuration with the pivot 420 being a center connecting point. The pivot 420 along with the connecting members linking to the set of wheels form at least a part of a height adjustment system as will be discussed in further detail along with FIG. 7 subsequently.

Figure 5:
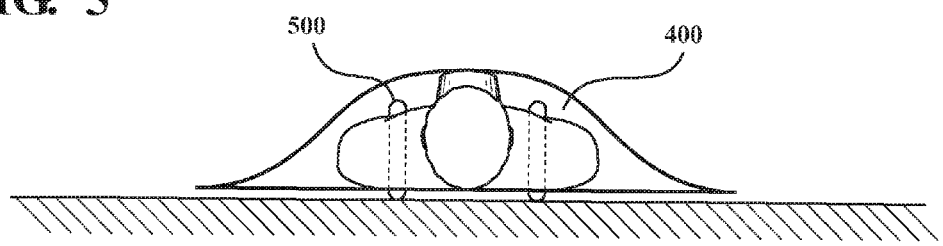
FIG. 5 illustrates a cutaway aft-view of one embodiment of the low-profile vehicle.
Figure 6:
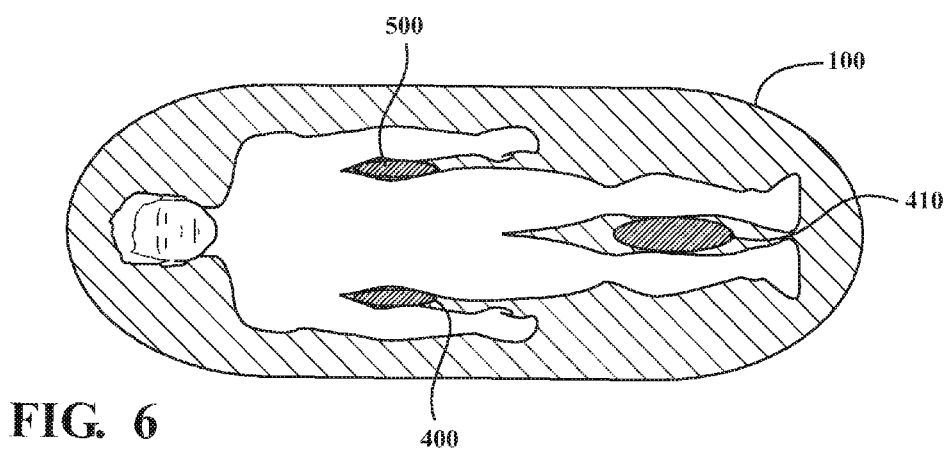
FIG. 6 illustrates a cutaway top-view of one embodiment of the low-profile vehicle.

FIG. 5 illustrates a cutaway aft view of the vehicle 100. As shown in FIG. 5, the passenger is visible in a lying down position with the wheel 400 under a right arm and a wheel 500 (i.e., hidden wheel) under a left arm of the passenger in a separate housing. FIG. 6 illustrates an interior view of the passenger compartment of the vehicle 100. In one embodiment, a propulsion system 141 includes a propulsion device disposed within a hub of at least one wheel of the set of wheels. In one embodiment, the propulsion device is an electric motor that drives the at least one wheel to propel the vehicle. Furthermore, the electric motor, in one embodiment, receives at least some electric power from the solar array disposed within the hatch 300. In either case, the propulsion system 141 of the vehicle 100 is generally of compact design such that additional space within the vehicle 100 beyond hubs of the one or more wheels is not consumed by the propulsion system 141.

Figure 7:
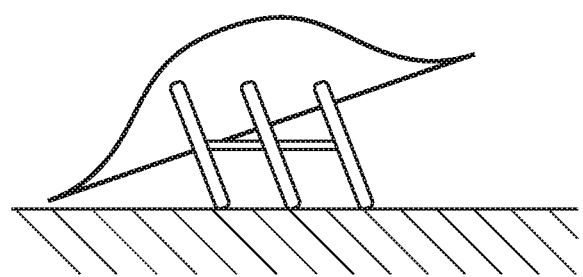
FIG. 7 illustrates a cutaway aft-view of one embodiment of the low-profile vehicle with wheels in a banking position.

FIG. 7 illustrates the vehicle 100 in a banked position. The height adjustment system, as previously noted in relation to FIG. 4, provides for adjusting a height of the individual wheels in relation to the body of the vehicle 200. For example, the members 440 and 430 can pivot about the pivot 420 to extend beyond an underside of the vehicle 100. Similarly, a member attached to the wheel 500 can pivot about the pivot point 420. Additionally, in one embodiment, the set of wheels may also travel vertically along an attachment point (e.g., spring) within a respective housing. Thus, the height adjustment system can function to individually adjust a height of each wheel separately or to coordinate heights of the separate wheels to produce the banked position as shown in FIG. 7. Thus, as one example, the height adjustment system can adjust heights for the separate wheels to bank when traveling around a corner. As a further example, the height adjustment system can adjust a height of the wheels together to travel over a curb, speed bump or other obstruction without impacting the vehicle body 200.

In a similar fashion, when the sensor system 120 detects an imminent impact with another vehicle or object, the height adjustment system can retract the wheels into the respective housings so that the vehicle body 200 rests on the ground, and a weight/force of the impact can be distributed over a whole underside of the vehicle 100 to the ground.

Figure 8A:
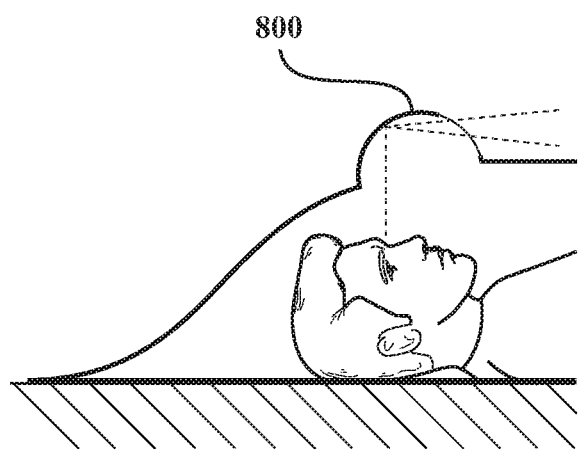
FIG. 8A illustrates a cutaway side-view of one embodiment of a viewing window.
Figure 8B:
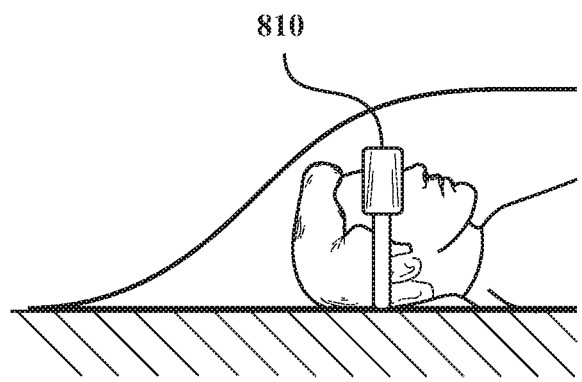
FIG. 8B illustrates a cutaway side-view of a passenger using a head-mounted VR headset.

Furthermore, the sensor system 120 can have an elevated role within the vehicle 100 because of the position of the passenger. That is, because the passenger is generally unable to view a forward area of the vehicle 100 various sensors are provided to facilitate providing the view so that the passenger can operate the vehicle 100 and/or so that the vehicle 100 can operate autonomously. For example, as shown in FIG. 8A a viewing window 800 is provided within a top surface (e.g., hatch 300) of the vehicle 100. The viewing window 800 includes, for example, a mirror and one or more lenses to provide a forward view to the passenger. Alternatively, in one embodiment, as shown in FIG. 8B, a head-mounted VR display 810 can be provided for the passenger to view a forward area of the vehicle 100.

In one embodiment, the display 810 is provided in combination with or as part of a viewing module 170. The viewing module 170 generally includes instructions that function to control the processor 110 to display images on the display 810. That is, in one embodiment, the viewing module 170 renders a video image according to an electronic signal received from a camera 126 that is mounted on or within the vehicle body 200. Accordingly, the viewing module 170 can receive signals from the camera 126 and/or other sensors of the sensor system 120 in order to display information to the passenger about current driving conditions and views around the vehicle 100. Alternatively, in one embodiment, the viewing module 170 provides entertainment content to the passenger while the vehicle 100 autonomously navigates along a path as controlled by the autonomous module 160.

In either case, the vehicle 100 also includes a plurality of different sensors that are embedded within and/or on the vehicle 100. Additionally, in one embodiment, the various vehicle systems 140 and/or the sensor systems also control charging of a battery bank used by the electric motor of the vehicle 100 via the array of solar cells.

Figure 9:
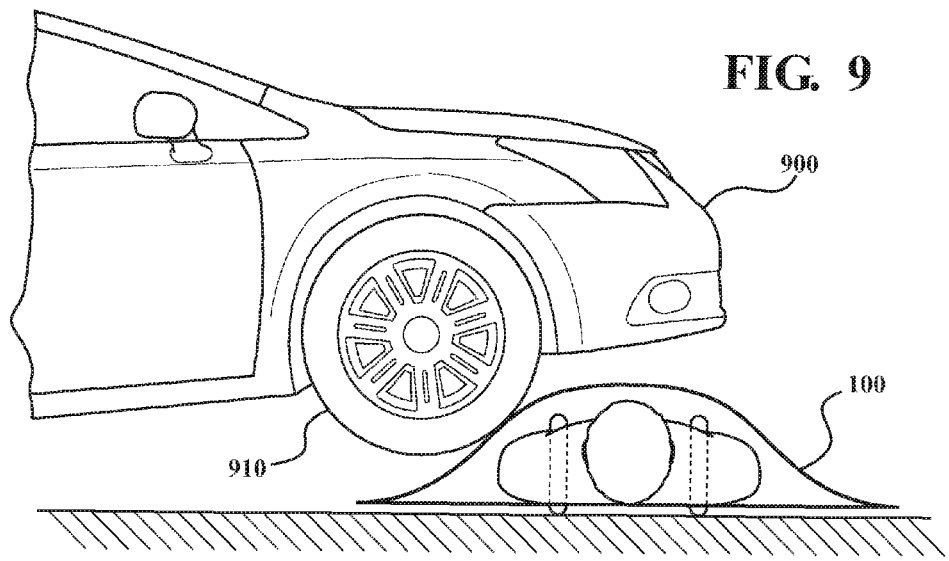
FIG. 9 illustrates a vehicle impacting and rolling over one embodiment of the low-profile vehicle.

As an additional explanation of the profile of the vehicle body 200, consider FIG. 9, which illustrates a vehicle 900 impacting the vehicle 100. As an additional note, FIG. 9 illustrates a cutaway view from an aft perspective of the vehicle 100. The vehicle 100 is illustrated with the vehicle 900 impacting a side via a wheel 910 of the vehicle 900. Thus, FIG. 9 illustrates how the exaggerated s-shaped profile of the vehicle 900 permits the vehicle 100 to roll over and not collide directly with the vehicle 100. In this way, an impact force between the vehicle 900 and the vehicle 100 is reduced.

Figure 10:
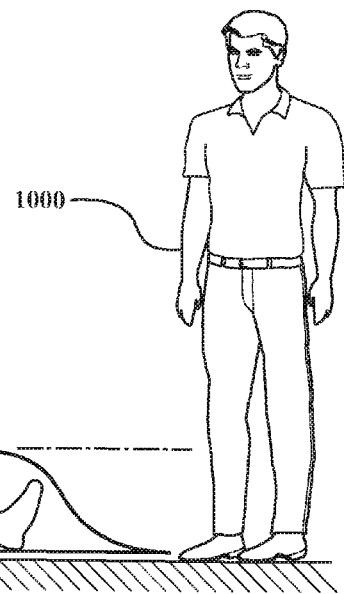
FIG. 10 illustrates a cutaway side-view of one embodiment of the low-profile vehicle encountering a pedestrian.

FIG. 10 illustrates another aspect of the vehicle 100 and how the profile of the vehicle 100 can further reduce impacts. In FIG. 10, the vehicle 100 is illustrated as impacting a pedestrian 1000. Because a body height of the vehicle 100 is proportional to a back-to-chest thickness of a passenger and thus does not rise to a same height as other vehicles, an impact with a pedestrian can also be reduced.

FIG. 11 and FIG. 12 illustrate additional aspects about the vehicle 100 and the low-profile design of the vehicle 100. For example, FIG. 11 illustrates how the vehicle 100 and the low-profile design of the vehicle 100 provide for traveling through tunnels underdeveloped areas. That is, because the vehicle 100 has a low-profile design with a reduced height in comparison to many other vehicles, a relative tunnel height that permits the vehicle 100 to pass through is also reduced. Accordingly, costs associated with providing non-traditional sub-surface routes for the vehicle 100 become more practical.

Moreover, FIG. 12 illustrates additional benefits of the low-profile design. Specifically, FIG. 12 illustrates how the vehicle 100 can be stacked for combined shipping and/or transport within an airplane. In particular, the vehicle 100 can be stacked onto rail cars and/or into other cargo carrying vessels when the vehicle 100 retracts wheels into the noted housings so that the vehicle 100 can be efficiently stacked. Additionally, in one embodiment, the vehicle 100 is equipped with a top surface and underside mounting system that permits locking between the vehicles when stacked. In this way, additional transportation options can be provided for the vehicle 100.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. Furthermore, the one or more data stores 115 and/or the memory 210 are, in one embodiment, distributed memories. That is, the data stores 115 and/or the memory 210 can be located remotely from the vehicle 100 and linked to the vehicle 100 through a wireless communication channel. Moreover, the distributed memory can be part of a cloud-based computing system that is provided to the vehicle 100 as part of a software as a service (SaaS).

The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors that are embodied as part of the vehicle 100. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., the present context).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described. As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the viewing module 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, and/or the autonomous driving module(s) 160 may control some or all of these vehicle systems 140 and, thus, may be partially or fully autonomous.

The processor(s) 110, the viewing module 170, and/or the autonomous driving module(s) 160 can be operatively connected to communicate with the various vehicle systems 140 and/or individual components thereof. For example, returning to FIG. 1, the processor(s) 110, the viewing module 170, and/or the autonomous driving module(s) 160 can be in communication to send and/or receive information from the various vehicle systems 140 to control the movement, speed, maneuvering, heading, direction, etc. of the vehicle 100. The processor(s) 110, the viewing module 170, and/or the autonomous driving module(s) 160 may control some or all of these vehicle systems 140.

The processor(s) 110, the viewing module 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the viewing module 170, and/or the autonomous driving module(s) 160 can control the direction and/or speed of the vehicle 100. The processor(s) 110, the viewing module 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the viewing module 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-12, but the embodiments are not limited to the illustrated structure or application.

The block diagrams in the figures illustrate the architecture, functionality, and operation of possible implementations of systems, methods and computer program products according to various embodiments. In this regard, each block in the block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device. Accordingly, the computer-readable storage medium is, in one embodiment, a distributed memory that is remotely located from a system (e.g., the module 170) and spread across one or more remote devices. Moreover, the distributed memory is generally linked with the module 170 via a communication channel such as a wireless (e.g., cellular, WLAN, etc.) or wired communication channel (e.g., optical fiber channel, coax channel, etc.). Furthermore, the distributed memory is provided, in one embodiment, as part of a Software as a Service (SaaS).

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A vehicle, comprising:
   a vehicle body having a profile that is substantially continuous around an outer perimeter of the vehicle, wherein the profile is comprised of a fin extending outward from a lower edge of the vehicle body and meeting a ramp of the vehicle body at a concave curve, wherein the ramp continues from the concave curve into a convex curve where the ramp transitions into a top surface of the vehicle body, and wherein the profile has an exaggerated s-shape;
   a hatch disposed within the top surface; and
   a passenger compartment disposed within the vehicle body and accessible through the hatch, wherein the passenger compartment is shaped to provide for a passenger to occupy the vehicle in a substantially lying down position.

2. The vehicle of claim 1, wherein the vehicle body is a monocoque.

3. The vehicle of claim 1, wherein a ratio of a concave radius of the concave curve to a convex radius of the convex curve is proportional to an average size of a vehicle tire to permit the profile of the vehicle body to deflect impacts with other vehicles.

4. The vehicle of claim 1, wherein the vehicle body extends above a roadway surface to a body height that is proportional to a passenger thickness when in the lying down position within the passenger compartment.

5. The vehicle of claim 1, wherein the vehicle is an electric vehicle.

6. The vehicle of claim 1, further comprising:
   a set of wheels extending from an underside of the vehicle body and extending into housings within the passenger compartment, wherein the housings are positioned within the passenger compartment between limbs of the passenger.

7. The vehicle of claim 6, further comprising:
a propulsion device disposed within a hub of at least one wheel of the set of wheels.

8. The vehicle of claim 7, wherein the propulsion device is an electric motor that drives the at least one wheel to propel the vehicle.

9. The vehicle of claim 1, further comprising:
a viewing window disposed within the hatch above a head region of the passenger compartment, wherein the viewing window includes at least an angled mirror to provide a forward view of an area in front of the vehicle to the passenger lying down in the passenger compartment.

10. The vehicle of claim 1, further comprising:
a plurality of sensors embedded within the vehicle body, wherein the plurality of sensors include at least a camera.

11. The vehicle of claim 1, further comprising:
one or more processors; and
a memory communicably coupled to the one or more processors and storing:
an autonomous driving module including instructions that when executed by the one or more processors cause the one or more processors to control the vehicle to steer, accelerate, and decelerate along a path as a function of at least electronic inputs from a plurality of sensors.

12. The vehicle of claim 11, further comprising:
a viewing module including instructions that when executed by the one or more processors cause the one or more processors to render a video image on a display,
wherein the display is a head-mounted display mountable to the passenger, and wherein the viewing module includes instructions to render the video image according to an electronic signal received from a camera mounted on the vehicle body.

13. The vehicle of claim 1, further comprising:
an array of solar cells embedded within the top surface of the vehicle body and configured to power a battery bank and an electric motor of the vehicle.

14. The vehicle of claim 1, further comprising:
a height adjustment system including:
a pivot point individually connecting separate support members to a set of wheels, wherein the pivot point provides for raising the vehicle off of a roadway surface and tilting the vehicle in relation to the roadway surface.

15. A vehicle, comprising:
a vehicle body having a profile that is substantially continuous around an outer perimeter of the vehicle, wherein the profile is comprised of a fin extending outward from a lower edge of the vehicle body and meeting a ramp of the vehicle body at concave curve, wherein the ramp continues from the concave curve into a convex curve where the ramp transitions into a top surface of the vehicle body, wherein the vehicle body is a monocoque, and
wherein a ratio of a concave radius of the concave curve to a convex radius of the convex curve is proportional to an average size of a vehicle tire to permit the profile of the vehicle body to deflect impacts with other vehicles;
a hatch disposed within the top surface;

a passenger compartment disposed within the vehicle body and accessible through the hatch, wherein the passenger compartment is shaped to provide for a passenger to occupy the vehicle in a substantially lying down position; and
a set of wheels extending from an underside of the vehicle body and extending into housings within the passenger compartment, wherein the housings are positioned within the passenger compartment between limbs of the passenger.

16. The vehicle of claim 15, further comprising:
a height adjustment system including:
a pivot point individually connecting separate support members to the set of wheels, wherein the pivot point provides for raising the vehicle off of a roadway surface and tilting the vehicle in relation to the roadway surface.

17. The vehicle of claim 15, further comprising:
a plurality of sensors embedded within the vehicle body, wherein the plurality of sensors include at least a camera
one or more processors; and
a memory communicably coupled to the one or more processors and storing:
an autonomous driving module including instructions that when executed by the one or more processors cause the one or more processors to control the vehicle to steer, accelerate, and decelerate along a path as a function of at least electronic inputs from a plurality of sensors.

18. The vehicle of claim 17, further comprising:
a viewing module stored in the memory and including instructions that when executed by the one or more processors cause the one or more processors to render a video image on a display,
wherein the display is a head-mounted display mountable to the passenger, and wherein the viewing module includes instructions to render the video image according to an electronic signal received from a camera mounted on the vehicle body.

19. The vehicle of claim 15, further comprising:
a height adjustment system including:
a pivot point individually connecting separate support members to the set of wheels, wherein the pivot point provides for raising the vehicle off of a roadway surface and tilting the vehicle in relation to the roadway surface.

20. A vehicle, comprising:
a vehicle body having a profile that is substantially continuous around an outer perimeter of the vehicle, wherein the profile is comprised of a fin extending from a lower edge of the vehicle body and meeting a ramp of the vehicle body at concave curve, wherein the ramp continues from the concave curve into a convex curve where the ramp transitions into a top surface of the vehicle body, and wherein the profile has an exaggerated s-shape;
a hatch disposed within the top surface;
a passenger compartment disposed within the vehicle body and accessible through the hatch, wherein the passenger compartment is shaped to provide for a passenger to occupy the vehicle in a substantially lying down position;
a plurality of sensors embedded within the vehicle body, wherein the plurality of sensors include at least a camera;
one or more processors; and a memory communicably coupled to the one or more processors and storing:
an autonomous driving module including instructions that when executed by the one or more processors cause the one or more processors to control the vehicle to steer, accelerate, and decelerate along a path as a function of at least electronic inputs from a plurality of sensors,
a viewing module including instructions that when executed by the one or more processors cause the one or more processors to render a video image on a display, wherein the display is a head-mounted display mountable to the passenger, and wherein the viewing module includes instructions to render the video image according to an electronic signal received from a camera mounted on the vehicle body.

* * * * *